Patented Feb. 26, 1924.

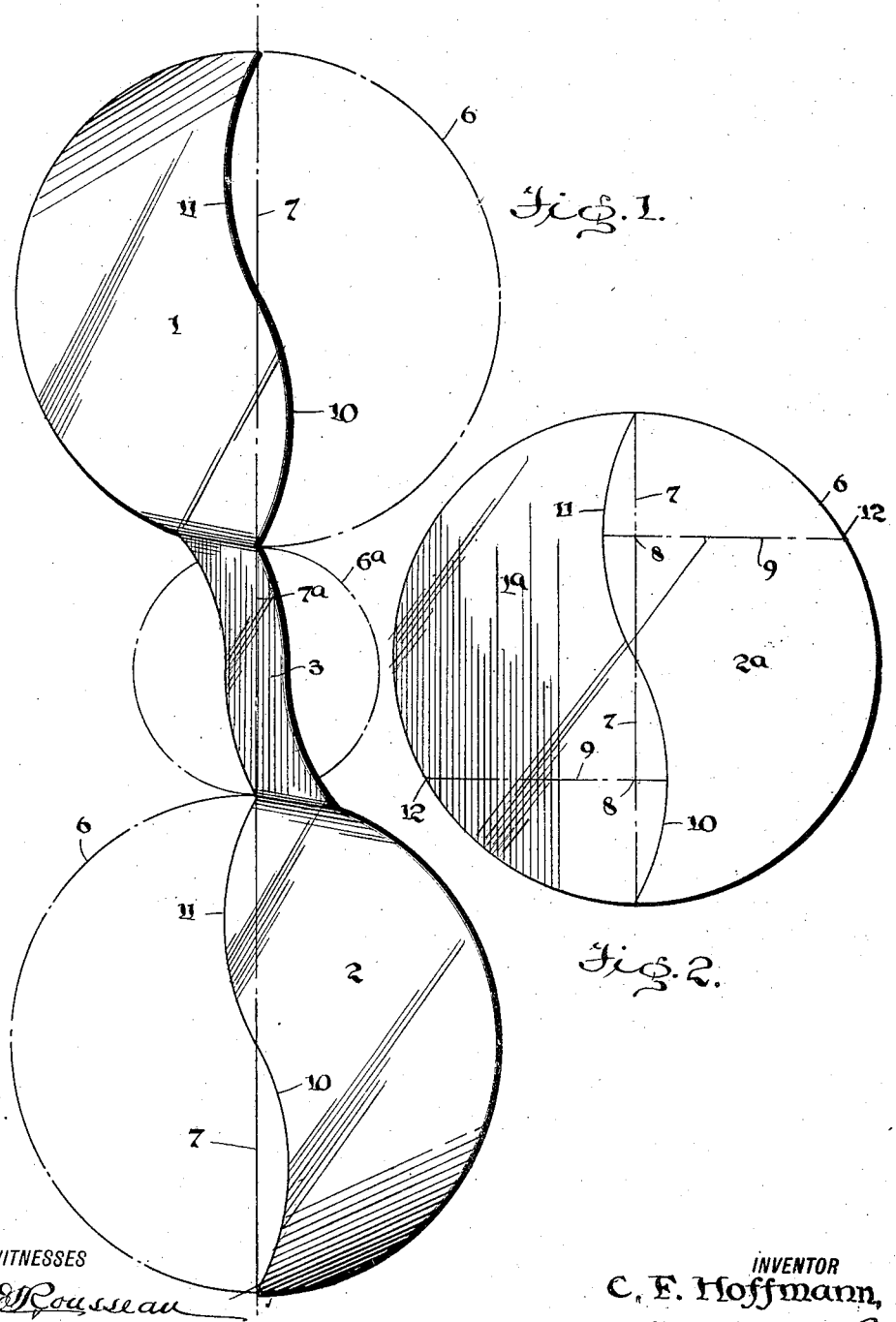

1,485,079

UNITED STATES PATENT OFFICE.

CHARLES F. HOFFMANN, OF SOUTH NORWOOD, OHIO.

PROPELLER BLADE.

Application filed October 24, 1922. Serial No. 596,621.

*To all whom it may concern:*

Be it known that I, CHARLES F. HOFFMANN, a citizen of the United States, and a resident of South Norwood, in the county of Hamilton and State of Ohio, have invented certain new and useful Improvements in Propeller Blades, of which the following is a specification.

This invention relates to propellers and has for its object the provision of a propeller having a pair of blades and an intermediate connecting member, with the length of a blade or wing and the length of the connecting member bearing a definite ratio regardless of the size of each wing. Each wing forms the complementary half of a circle, the diameter of which being equal to the length of a blade or twice the length of the connecting means.

Other objects and advantages of the invention will be apparent during the following description.

The invention is illustrated by way of example in the accompanying drawing, in which, Figure 1 is a plan view of a pair of my improved propeller blades connected together by an intermediate member.

Figure 2 discloses a circle showing the method of forming two propeller blades from a circle.

Referring to the drawings, 1 and 2 designate propeller blades, formed according to my new process, and which are connected by an intermediate member 3. The intermediate member 3 is merely shown for purposes of illustration and any form of means may be employed for connecting the two wings 1 and 2 of the propeller blade providing a certain ratio is maintained between the lengths of the blades and the connecting member.

Referring to Figure 2, a circle 6 is shown with a vertical diameter which is divided into the two radii 7. The radii will therefore be half the length of the diameter. Each one of the radii is divided in half and a point 8 designates the middle of the line, perpendicular lines 9 are erected on the radii 7 with the perpendicular passing through the points 8. If, in the case shown, the diameter of the circle 6 is two feet, each of the radii would be one foot.

The arcs 10 and 11 are drawn by using as centers the points 12 where the perpendiculars cut the circumference with the radii of the circles of which the arcs 10 and 11 form a part equal in length to the radius of the circle 6. The ends of the arcs thus described pass through the center of the circle 6 and through the ends of the vertical diameter.

The arcs 10 and 11 described in the circle 6 divide said circle into two equal parts and form when the circle is cut in half and along these arcs, the trailing edge of each wing while the semi-circular edges form the leading edges of the wings. The division of the circle 6 provides two wings $1^a$ and $2^a$ which are proportionate to the wings 1 and 2 shown in Figure 1. It is by this process that I have constructed wings of a propeller which may be used for aeroplanes, motorboats, fans or helicopters and which gives a more efficient propeller than has been heretofore constructed.

Since the diameter $7^a$ of the circle $6^a$ of Figure 1 is equal to one half the diameter of the circle 6 the length of the connecting member 3 is one half the length of a wing 1 or 2 or one half the diameter of the circle 6.

The points 12 on the circumference 6 may be readily determined by placing one leg of a compass at an extreme end of the diameter composed of the radii 7 and with an arc, the radius of which is equal to the radii 7, cutting the circumference at 12. Using the point 12 as a center and a radius equal to the radius of the circle, the arcs 10 and 11 may be described as has been stated.

The blades 1 and 2 may be made of any light material such as aluminum or may be formed in the usual manner and provided with reinforcing rods extending across the inner face of the blade 1 or 2 with the reinforcement bordering the periphery of the blade.

The blades 1 and 2 with the intermediate member 3 are especially adapted for use in helicopters or other makes of flying machines forming the propeller for said machines. Smaller sizes of the device may be used as propellers for motor-boats, or fans on automobiles or in mines. Very small sizes may be employed in the construction of a toy.

By constructing the wings according to the process as has been previously outlined, the greatest possible stability, resistance and lifting power is obtained. The ratio between the length of the intermediate member 3 and the length of the blades is such as to space the blades sufficiently apart whereby the whole area of the blades may be affected by the air.

The limitation area as employed in the specification and claims is intended to define the surface of a plane passing through the trailing and leading edges and limited by such edges.

It is intended that the wings are to be convexly curved to conform to the curvature of a bird's wings when extended for flight. While I have shown the wings made of a single piece of material, they may be made of any number of parts so long as the comparative dimensions are retained.

What I claim is:

1. The process for forming a pair of wings from a circular piece of material which consists in locating the diameter of the circle, forming a line of intersection on the circle in the form of a pair of arcs extending in opposite directions from each other upon opposite sides of the diameter of the circle, and cutting the material along this line.

2. The process for forming a pair of wings from a circular piece of material which consists in locating the diameter of the circle, forming a line of intersection on the circle in the form of a pair of arcs extending in opposite directions from each other upon opposite sides of the diameter of the circle, the oppositely disposed arcs forming part of a circle, the radius of which is equal to the radius of the original circle, and then cutting the material along the arcs forming the division line of the circular material.

3. The process for forming a pair of wings from a circular piece of material which consists in locating the diameter of the circle, forming a line of intersection on the circle in the form of a pair of arcs extending in opposite directions from each other upon opposite sides of the diameter of the circle, the oppositely disposed arcs forming part of a circle, the radius of which is equal to the radius of the original circle, the center of the circle of which the arcs form a part being located on the circumference of the first mentioned circle where a perpendicular drawn from the center of a radius cuts the circumference of the circle, and then cutting the material along the arcs forming the division line of the circular material.

4. A propeller blade having two side edges terminating in a point at one end of the blade, with one end of the propeller blade reduced in width while the other end of the propeller blade has a greater width than the first mentioned end, one edge of the propeller blade being curved to conform to the shape of a semi-circumference while the other edge conforms to the shape of an ogee, the area of a blade being one half the area of a circle, the length of the diameter of which is equal to the length of the line connecting the ends of the semi-circumferential side.

5. A propeller comprising two wings connected together by an intermediate member the length of each blade being twice the length of the intermediate connecting member.

6. A propeller comprising two wings connected together by an intermediate member the length of each blade being twice the length of the intermediate connecting member, each wing having a leading edge and a trailing edge meeting in a point at one end of the blade, with one end of the propeller blade reduced in width while the other end of the propeller blade has a greater width than the first mentioned end, the leading edge of the propeller blade being curved to conform to the shape of a semi-circumference while the trailing edge conforms to the shape of an ogee, the area of a blade being one half the area of a circle, the length of the diameter of which is equal to the length of the line connecting the ends of the leading edge.

7. A propeller comprising two wings connected together by an intermediate member, the length of each blade being twice the length of the intermediate connecting member, each wing being equal in area to one half the area of a circle, the diameter of which is equal to substantially twice the length of the intermediate member.

CHARLES F. HOFFMANN.